Jan. 5, 1954 L. A. PAINE 2,665,185
PENCIL CHART MECHANISM
Filed April 14, 1949 2 Sheets-Sheet 1

Inventor
Louis A. Paine
By:-
Louis Robertson Atty.

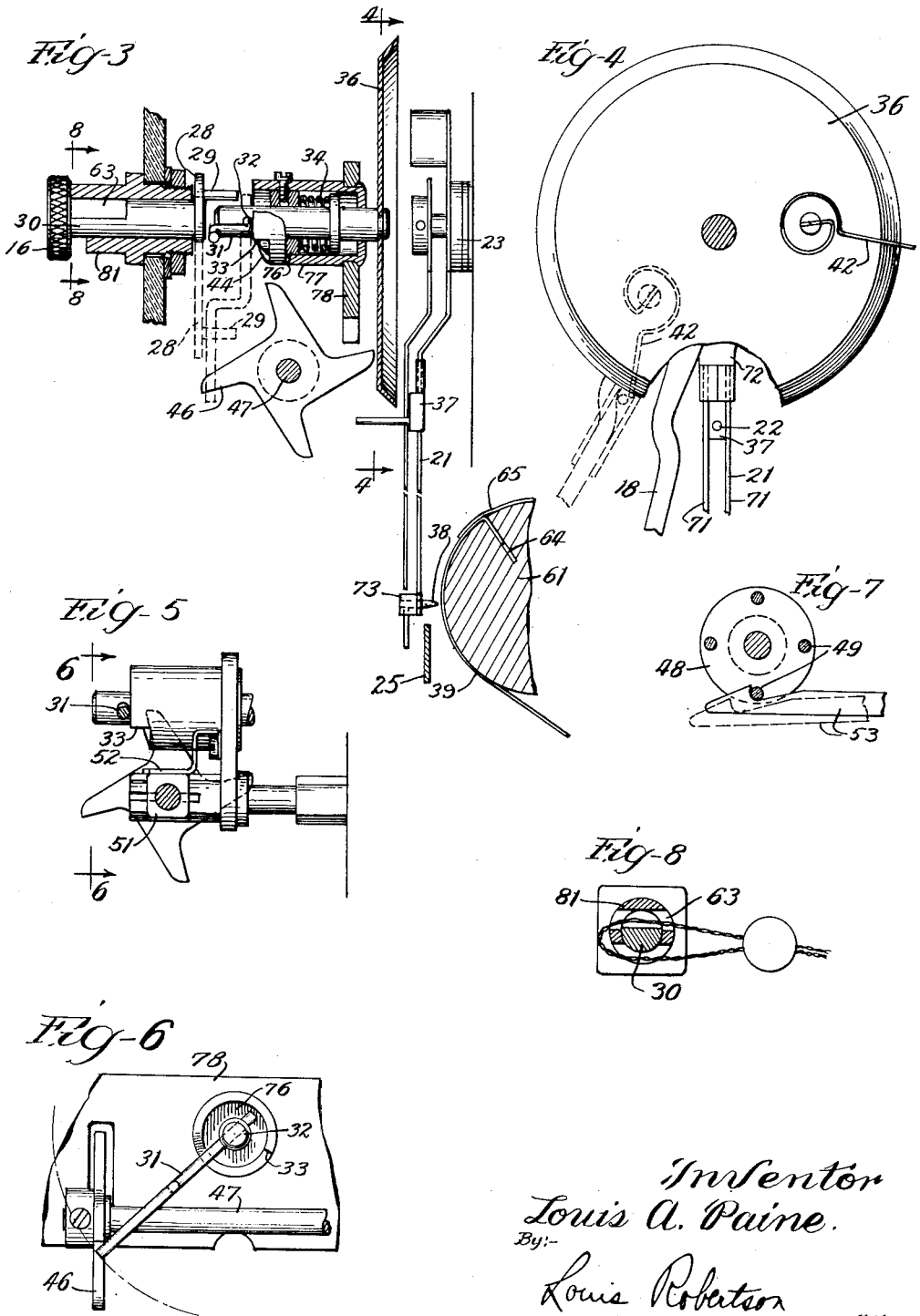

Patented Jan. 5, 1954

2,665,185

UNITED STATES PATENT OFFICE 2,665,185

PENCIL CHART MECHANISM

Louis A. Paine, West Lafayette, Ind., assignor to Duncan Electric Manufacturing Company, Lafayette, Ind., a corporation of Illinois Application April 14, 1949, Serial No. 87,545

4 Claims. (Cl. 346—30)

Graphic recording mechanisms have long presented a serious problem, especially when there was any desire to avoid frequent servicing. A stylus which makes its record in ink is very troublesome and is entirely unsuitable for long periods without attention. A wax-coated graph with a hot stylus has some advantages, but also some serious disadvantages. Heating the stylus requires power. The whole record is likely to be entirely lost if the graph is subjected to excessive temperatures. Other hot wire recording schemes have been tried and found troublesome or undependable under common service conditions.

An example of extremely severe requirements is that of a recording maximum-demand electricity meter in which the mechanism is preferably left sealed within a housing for several years and in which the torque available for moving the stylus is fairly low. According to the present invention even the severe requirements of such a meter have been met. The stylus uses an ordinary pencil lead but ordinarily the lead either does not touch the paper or touches it too lightly to either produce a mark or cause appreciable friction. Once each billing period, when the meter reader makes his rounds, he unseals a knob on the cover, turns the knob one revolution and reseals it with the usual sealing wire to prevent its being turned during the next billing period. This simple turn of the knob presses the maximum pointer toward the chart so that the pencil lead bears thereon sufficiently firmly to make a mark, and then moves the maximum pointer toward the zero position, thus making a mark on the chart which shows the position of the maximum demand pointer before it was reset. After the maximum pointer is moved past the momentary position of the momentary pointer, it is released and allowed to be pressed back by the momentary pointer while still subject to a friction drag so that it will not be thrown too far upscale.

Additional objects and advantages of the invention will be apparent from the following description and from the drawings in which:

Fig. 3 is a vertical sectional view taken approximately on the line 3—3 of Fig. 1, with some distortion for clarity.

Fig. 4 is a fragmentary sectional view taken approximately on the line 4—4 of Fig. 3 showing the reset disk and spring finger.

Fig. 5 is a fragmentary view showing particularly the spring and positioning block on the chart driving shaft.

Fig. 6 is a fragmentary sectional view taken approximately on the line 6—6 of Fig. 5 but with the parts turned to show the actuation of the chart driving shaft.

Fig. 7 is a fragmentary sectional view taken on the line 7—7 of Fig. 1 showing the actuation of the oscillating chart driving lever.

Fig. 8 is a sectional view taken on the line 8—8 of Fig. 3, but showing a conventional locking seal in place.

Although the laws requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements or combinations in which the inventive concepts are found.

Figure 1:
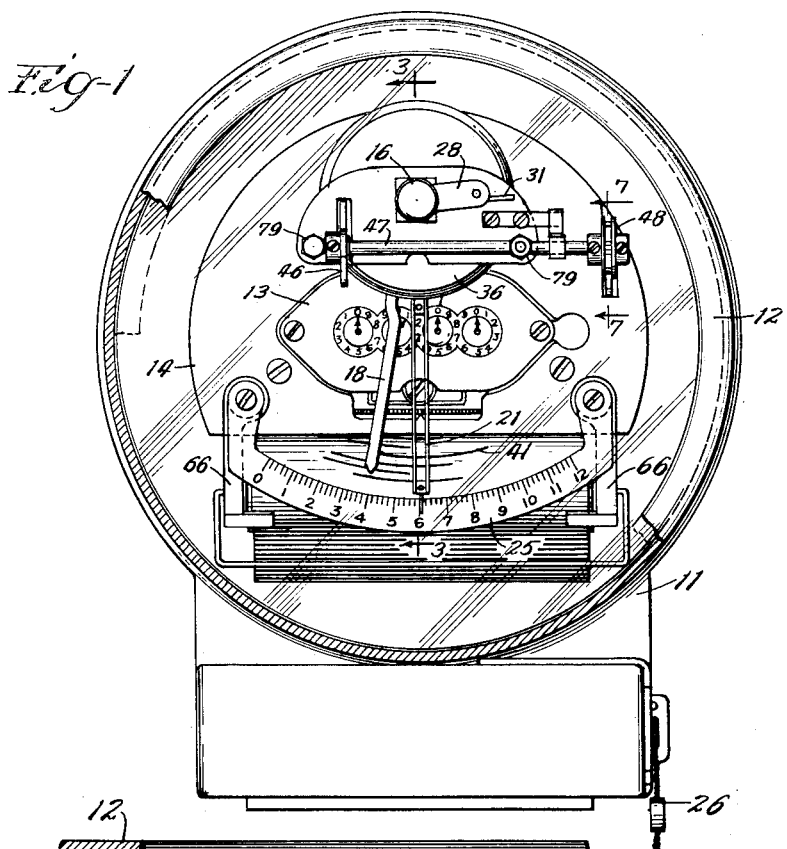
Figure 1 is a front view of a meter showing the form of the invention chosen for illustration combined with a watthour meter, a fragment of the face plate being broken away for clarity.

In Fig. 1 the combined meter is shown in conjunction with a base 11 and cover 12. Behind the cover 12 and carried by the base 11 is a watthour measuring element which drives an integrating register 13 and which supports a face plate 14. By face plate is meant the support plate, which in turn may be covered by a thin sheet or face for bearing indicia. Most of the parts of the present invention are mounted on the face plate 14, although they are driven by a reset knob 16, the spindle of which extends through the glass 17 of cover 12.

General operation

It is believed that the structure will be more easily understood after a brief description of the general operation. During the month or other billing period the momentary demand pointer 18 moves back and forth in accordance with the demand, being actuated by a demand metering unit represented somewhat diagrammatically at 19. The momentary pointer 18 may be called a pusher because it pushes ahead of it a maximum demand pointer 21. The interconnection may be through a pin 22 upstanding from the maximum demand pointer 21 and against which the pusher 18 presses when it is pushing the maximum demand pointer 21 to a more advanced position. The maximum demand pointer 21 is retained in the most advanced position to which it is pressed.

being balanced and mounted by a friction device 23. Preferably the friction is applied mainly by silicone stopcock grease.

At the end of the billing period when a meter reader makes his rounds he notes the reading of the register 13, as in more ordinary electric meters, and also the position of the maximum demand pointer 21 on scale 25. Then he resets the maximum demand pointer by moving it downscale at least as low as the then position of the momentary pointer 18. This resetting is conventionally accomplished by removing a lead sealing device 24 from a knob such as the knob 16, and turning the knob. Another lead seal 26 prevents access to the inside of the cover, the cover preferably staying sealed for several years.

It is desirable to have a record made within the meter showing the position of the maximum demand pointer 21 at the end of each billing period before it was reset. One reason for this is to allay the suspicions of some power subscribers that the meter reader reads a higher value than was correct. The locked-in record also serves to reduce the temptation of some subscribers to try to bribe the meter reader to report a lower maximum demand than the actual reading. The present invention relates primarily to the making of this record. It is made simply by turning the knob 16. This presses pencil point 38 on maximum pointer 21 against the chart paper 39, moves the pointer back downscale, releases it gradually, and advances the chart to present a clean surface for the same operation at the end of the next billing period.

*Detailed description of operation*

When the meter reader removes the seal 24 and turns the knob 16, an arm 28 on the inside of the cover turns with the knob 16, being connected thereto by shaft 30. A pin 29 extends rearwardly from arm 28 and engages a wire crank arm 31 which is carried by a shaft 32. As the meter reader turns knob 16, the associated pin 29 turns the arm 31.

*Chart marking*

As the arm 31 passes shoulder 33, spring 34 presses the shaft 32 rearwardly, moving pressure plate or disk 36 against maximum demand pointer 21, or more accurately against pressure block 37 thereon. Maximum demand pointer 21 carries a lead or pencil point 38 which is pressed firmly against a chart paper 39 by the action of the pressure plate 36. Continued turning of the knob 16 moves the pencil point 38 along the chart, making a mark such as the mark 41 seen in Fig. 1. This movement of the maximum demand pointer 21 is accomplished by a spring finger 42 carried by the pressure plate 36, as seen in Fig. 4.

When the maximum demand pointer 21 has been pressed downscale (toward zero) to the position of momentary pointer 18, the pin 22 will strike the pointer 18 and, as indicated by dotted lines in Fig. 4, push the pointer 18 downscale. This movement of the pointer 18 is resisted by the demand measuring element 19, the resistance increasing as the momentary pointer 18 is moved further from its correct momentary position. The spring reset finger or lever 42 is preferably made delicate enough so that it will yield, as seen in dotted lines in Fig. 4, and will be incapable of pressing the momentary pointer 18 very far away from its correct position. As the knob 16 turns the pressure disk 36 further, the reset lever 42 will yield enough to slip past the pin 22.

*Slow return*

When the pin 22 is thus released by reset lever 42 the torque on the momentary pointer 18 tending to return to its proper position would throw the demand pointer 21 upscale beyond this position if the upscale movement were not retarded. According to the present invention it is retarded, however, by keeping the pressure plate 36 pressing on the block 37 until after the momentary pointer 18 has had time to move, with the demand pointer 21, approximately back to the correct position. Thereafter continued rotation of the knob 16 turns the wire arm 31 further until it rides upwardly on cam 44, thus withdrawing the pressure plate 36 from the maximum demand pointer 21.

*Chart advancing*

Figure 2:
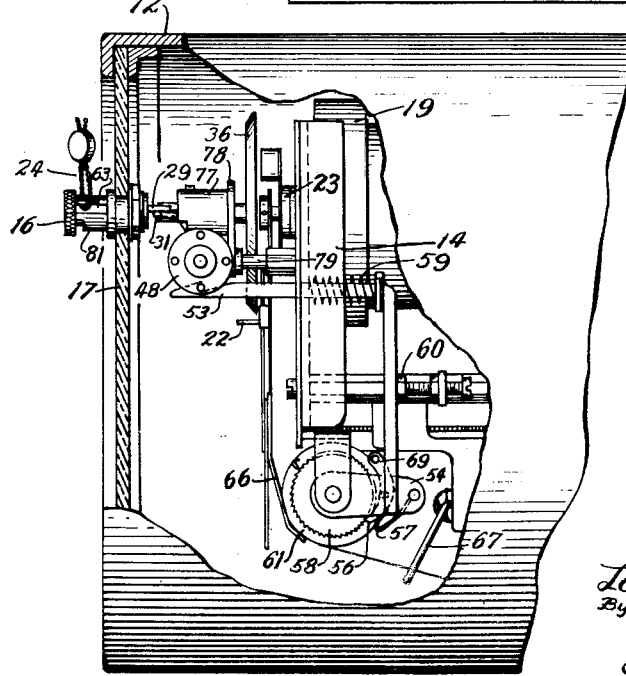
Fig. 2 is a fragmentary side view showing especially the side view of the form of the invention illustrated in Fig. 1.

There is still the problem of advancing the chart so that a clean portion thereof will be in position to be marked by pencil point 38 at the end of the next billing period. The chart is advanced by further rotation of the knob 16. This is accomplished when crank arm 31 strikes an arm of star wheel 46, as seen best in Figs. 3 and 6. In Fig. 3 the star wheel is shown slightly below true position for clarity. When the crank arm 31 turns the star wheel 46, the latter turns the chart driving shaft 47, which in turn rotates actuating wheel 48. The actuating wheel 48 bears four pins 49. Between operations the shaft 47 is held by block 51 thereon and flat spring 52 in a position with the pins 49 as seen in Fig. 7 and the star wheel 46 as seen in Fig. 3. In Fig. 7 it will be seen that a lever 53 is resting on a pin 49 and will be moved by this pin upon clockwise rotation of wheel 48. As seen in Fig. 2, the lever 53 is an L-shaped lever which in turn is a rigid extension of pawl actuating segment or lever 54, so that movement of lever 53 rocks segment 54. Segment 54 bears a pawl 56 which, by a spring 57, is urged into engagement with a ratchet wheel 58. Movement of lever 53 by actuating wheel 48 retracts pawl 56 along one or more teeth and return spring 59 then moves the pawl lever 54 in the opposite direction so that the pawl 56 drives ratchet wheel 58 and chart drum 61 in a clockwise direction. Lever 53 escapes from pin 49 to permit this return movement. By virtue of the fact that, as seen in Fig. 7, the lever 53 moves to the dotted line position, the pin 49 will pass around and away from the lever 53, letting the latter return under the influence of its spring 59. This spring-urged movement of lever 53 is limited by a stop 60 which has been made adjustable. In production a fixed stop will suffice.

The knob 16 is now turned for the remainder of one revolution and a new sealing wire inserted through passage 63 and the lead seal closed thereon.

*Structural details*

Although the foregoing description alone is enough to enable anyone skilled in the art to construct the device of this invention, some further description of structural details of the form of the invention which has been found satisfactory may be helpful.

The chart may comprise a straight length of paper folded at one end at right angles to the length. The fold is slipped into a slot 64 (Fig. 3) to align the paper for rolling evenly on the drum 61. It is held in the slot by a small piece of adhesive film 65. Preferably the paper is held snug or taut on the drum 61 by spring fingers 66 secured to face plate 14. This permits the free end of the paper to be tucked through a bale 67 so that there is no necessity for a second roll to wind the paper from one roll to the other. If the feed of drum 61 each month is not more than necessary for clarity, it is possible to have one strip of paper, which merely extends back approximately to the base 11, last at least six or eight years. It has been found practical to have the drum 61 rotate only about $\frac{1}{50}$ of a revolution each time so that one revolution accounts for fifty billing periods (usually months). Hence the ratchet wheel 58 has about fifty teeth or a multiple thereof. At the start the slot 64 should be turned to approximately the position shown in Fig. 3 so that at no part of its possible movement will the pencil point on demand pointer 21 cross the slot where it might catch. During the next revolution when the slot is covered by a layer of paper there will be no danger.

The spring finger 66 will tend to prevent accidental rotation of the drum 61, as for example when the pawl lever 54 is retracted before a driving stroke. However, additional friction springs may be provided at one or both ends of the drum if desired or found necessary. If at any time it is necessary to draw the chart backwards, as for example in removing the chart, it is merely necessary to press on the upper end 69 of pawl 56 and pull on the chart paper, the spring friction members permitting the drum 61 to unwind.

The preferred construction of the maximum demand pointer is seen in Fig. 4. Here it is seen that two wires 71 are secured to the hub plate 72 and that their lower ends are secured to the pencil block 73. The wires 71 are preferably of Phosphor bronze, as are all other springs herein. This construction is light, to facilitate counterbalancing, and gives a desirable degree of flexibility in the direction toward and from the drum 61 while being quite rigid in the lateral direction. The flexibility in the direction toward and from the drum is especially desirable because the pencil does not operate along a flat surface. The drum 61 is preferably positioned so that the bottom of the pencil arc and the top of the pencil arc are about equally below and above, respectively, the horizontal center plane of the drum. This flexibility is not relied upon to avoid drag during the measuring period, but instead a looseness in the friction device 23 is relied upon so that the pencil 38 can ride on the chart without any resilient pressure thereon at all.

The shaft 32 is carried by spaced bearings 76 in a sleeve or cup 77 which is staked in plate 78. Plate 78 is carried by studs 79 which extend outwardly from the face plate 14. These same studs 79, or rather elongated nuts thereon, may form the bearings for shaft 47. If holder 77 is in the form of a cup, the bottom thereof forms one bearing for the shaft 32, the other bearing being formed by an inserted bushing. Spring 34 may bear against the bushing and against a collar on the shaft 32.

The knob 16 is preferably so constructed that it can be sealed only in one position. This tends to ensure its being turned a complete revolution so as to restore the disk 36 and its associated parts to their starting position. A ratchet for preventing reverse movement of knob 16 can be provided if desired. The construction of the knob 16 which limits its sealing to one position is seen best in Fig. 8, from which it is apparent that the passage 63 is formed in part in the shaft or spindle 30 and in part in the sleeve 81 which is firmly secured to the cover glass 17. The passage 63 lies entirely to one side of the axis of the spindle 30 so that the parts of the passage are only in alignment when the spindle is in the position shown.

The reset lever, the disk carrying it, and the wire arm may jointly be called a rotor.

From the foregoing it is seen that a recording mechanism is provided which has all of the advantages of a pencil point from the standpoint of dependability and freedom from servicing, but which avoids the friction during measurement which would result from a sufficient pressure to mark the chart with the pencil. A single reset knob applies the necessary pressure for marking, moves the pencil, releases the pencil and advances the chart to a position to receive a new mark.

I claim:

1. A recording maximum-demand meter including a demand measuring element including a pusher, a maximum demand pointer frictionally retained at any position to which it is moved and movable upscale by the pusher, a marking pencil lead carried by the pointer, a chart adjacent the path of the lead but at a position such that the lead does not normally mark thereon, a cover for said mechanism, a reset knob extending through said cover, and reset and chart-marking and chart-moving mechanism within said cover adapted to be actuated by turning said knob and including supporting means, a rotor, means mounting the rotor for rotation and axial movement in a position such that axial movement in one direction will press the rotor against the pointer and move the lead thereof into marking engagement with the chart, a spring urging said rotor in that axial direction, cam means cooperating between said rotor and said supporting means for moving the rotor out of contact with the pointer and having an abrupt shoulder for allowing the spring to move the rotor axially as specified, and a reset lever carried by said rotor and positioned at the time of said axial movement beyond the point of maximum possible movement of the pointer but moving with said rotor to move said pointer along said chart toward the zero position, said reset lever being resilient and sufficiently yieldable to release said pointer under the influence of the pusher after the pointer has pushed the pusher downscale; said cam means being shaped to leave the rotor bearing on the pointer to retard its upscale movement by the pusher until the rotor has been turned to move the lever past the zero position.

2. A reset and chart marking device for operating a pointer within a cover having a resetting knob thereon including a rotor rotated by said knob, a spring biasing said rotor in an axial direction toward the pointer to bear upon the pointer in the direction of its pivotal axis to press the pointer against a chart, a reset lever associated with and moved by the rotor, cam means adapted to release the rotor to bear upon the pointer when the reset lever is beyond the point of maximum movement of the pointer, and to withdraw the rotor from the pointer after the reset lever has passed the zero position, said reset lever engaging said pointer in a yieldable manner to release the pointer before the rotor has been withdrawn therefrom, and means actuated upon movement of the rotor in its withdrawn position for advancing the chart, said means comprising a chart roller by which the chart is moved, a rotating drive member rotated with the rotor when the rotor is withdrawn, a ratchet wheel associated with the chart roller, a pawl cooperatively associated with the ratchet wheel and lever means associated with the pawl and the rotative driving member for oscillating the pawl.

3. A reset and chart marking device for operating a pointer within a cover having a resetting knob thereon including a rotor rotated by said knob, a spring biasing said rotor in an axial direction toward the pointer to bear upon the pointer in the direction of its pivotal axis, a reset lever associated with and moved by the rotor, and cam means adapted to release the rotor to bear upon the pointer when the reset lever is beyond the point of maximum movement thereof, and to withdraw the rotor from the pointer after the reset lever has passed the zero position, said reset lever engaging said pointer in a yieldable manner to release the pointer before the rotor has been withdrawn therefrom.

4. A reset and chart marking device for operating a pointer within a cover having a resetting knob thereon including a rotor rotated by said knob, a spring biasing said rotor in an axial direction toward the pointer to bear upon the pointer in the direction of its pivotal axis to press the pointer against a chart, a reset lever associated with and moved by the rotor, cam means adapted to release the rotor to bear upon the pointer when the reset lever is beyond the point of maximum movement thereof, and to withdraw the rotor from the pointer after the reset lever has passed the zero position, said reset lever engaging said pointer in a yieldable manner to release the pointer before the rotor has been withdrawn therefrom, and means actuated upon movement of the rotor in its withdrawn position for advancing the chart.

LOUIS A. PAINE.

References Cited in the file of this patent
UNITED STATES PATENTS

| Number | Name | Date |
|---|---|---|
| 1,138,785 | Porter | May 11, 1915 |
| 1,139,466 | Robinson et al. | May 11, 1915 |
| 1,169,508 | Porter | Jan. 25, 1916 |
| 2,268,705 | Green et al. | Jan. 6, 1942 |
| 2,285,859 | Hurt | June 9, 1942 |
| 2,305,504 | Wagner | Dec. 15, 1942 |
| 2,505,300 | Nace | Apr. 25, 1950 |
| 2,514,974 | Schauer | July 11, 1950 |
| 2,531,948 | Road | Nov. 28, 1950 |
| 2,590,459 | Pudelko | Mar. 25, 1952 |